(12) United States Patent
Khavasi

(10) Patent No.: US 10,171,117 B1
(45) Date of Patent: Jan. 1, 2019

(54) METHODS AND APPARATUS TO MEASURE EXPOSURE TO BROADCAST SIGNALS HAVING EMBEDDED DATA

(71) Applicant: The Nielsen Company (US), LLC, New York, NY (US)

(72) Inventor: Girish Khavasi, Lake Hiawatha, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/636,035

(22) Filed: Jun. 28, 2017

(51) Int. Cl.
*H04B 1/16* (2006.01)
*H04B 1/06* (2006.01)
*H04W 4/02* (2018.01)
*G06Q 30/02* (2012.01)

(52) U.S. Cl.
CPC ........... *H04B 1/06* (2013.01); *G06Q 30/0201* (2013.01); *H04W 4/02* (2013.01)

(58) Field of Classification Search
CPC ........ H04B 1/06; G06Q 30/0201; H04W 4/02
USPC ........................................................ 455/205
See application file for complete search history.

(56) References Cited

U.S. PATENT DOCUMENTS

| | | |
|---|---|---|
| 5,382,970 A | 1/1995 | Kiefl |
| 5,475,874 A | 12/1995 | Klos |
| 5,896,554 A | 4/1999 | Itoh et al. |
| 6,240,280 B1 | 5/2001 | Ravi et al. |
| 6,467,089 B1 | 10/2002 | Aust et al. |
| 8,326,216 B2 | 12/2012 | Masamoto et al. |
| 8,549,552 B2 | 10/2013 | Ramaswamy et al. |
| 8,571,501 B2 | 10/2013 | Miller et al. |
| 8,634,944 B2 | 1/2014 | Bull et al. |
| 2007/0141979 A1 | 6/2007 | Brey |
| 2009/0124264 A1 | 5/2009 | Su |
| 2010/0159836 A1 | 6/2010 | Lau et al. |

(Continued)

FOREIGN PATENT DOCUMENTS

| | | |
|---|---|---|
| GB | 2375263 | 11/2002 |
| WO | 9111062 | 7/1991 |

(Continued)

OTHER PUBLICATIONS

Audemat, "Audemat FM MC5," retrieved from Internet on Sep. 27, 2016, 1 page.

(Continued)

*Primary Examiner* — Sanh Phu
(74) *Attorney, Agent, or Firm* — Hanley, Flight & Zimmerman, LLC

(57) ABSTRACT

Example methods and apparatus to measure exposure to broadcast signals having embedded data are disclosed. An example broadcast signal exposure meter includes a first decoder to obtain an identifier of a broadcast station from an audio signal output by an end user broadcast receiver, a radio to tune to a broadcast signal from the broadcast station associated with the identifier of the broadcast station, a second decoder to obtain embedded data from the broadcast signal, the embedded data representing media contained in the broadcast signal, and an interface to provide the embedded data to a server, the server to determine audience measurement information for the media based on the provided embedded data.

17 Claims, 3 Drawing Sheets

(56) References Cited

U.S. PATENT DOCUMENTS

2011/0264455 A1* 10/2011 Nelson .................. H04H 60/31
                                                  704/500
2013/0029646 A1*  1/2013 Chowdhury .......... G06Q 20/22
                                                  455/414.1

FOREIGN PATENT DOCUMENTS

WO       9417609     8/1994
WO       9913593     3/1999

OTHER PUBLICATIONS

Deva Broadcast, "Radio Explorer II," retrieved from Internet on Sep. 27, 2016, [http://www.devabroadcast.com/radio%ADexplorer%AD21/2], 2 pages.

Inovonics, "402 INOmini RDS Sign Driver/Receiver," retrieved from Internet on Sep. 27, 2016, [http://www.inovonicsbroadcast.com/model/402], 2 pages.

Inovonics, "720 Dynamic RDS Encoder," retrieved from Internet on Sep. 27, 2016, [http://www.inovonicsbroadcast.com/model/720], 2 pages.

Inovonics, "RDS," retrieved from Internet on Sep. 27, 2016, [http://www.inovonicsbroadcast.com/productline?cat=RDS], 2 pages.

Radio World, "Audemat-Aztec Adds to Metering, RDS Product Lines," published Apr. 14, 2004, 2 pages.

* cited by examiner

METHODS AND APPARATUS TO MEASURE EXPOSURE TO BROADCAST SIGNALS HAVING EMBEDDED DATA

FIELD OF THE DISCLOSURE

The present disclosure relates generally to broadcast signals having embedded data and, more particularly, to methods and apparatus to measure exposure to broadcast signals having embedded data.

BACKGROUND

Some broadcast signals (e.g., frequency modulation (FM) radio broadcast signals) include, typically limited amounts of, embedded data. For FM radio broadcasts, an example communication protocol used to carry embedded data is radio data system (RDS), or radio broadcast data system (RBDS), which is the United States (U.S.) version of RDS. Example embedded information includes time, station identification, program information, etc.

Audience measurement entities (AMEs) perform, for example, audience measurement, audience categorization, measurement of advertisement impressions, measurement of media exposure, etc., and link such measurement information with demographic information. AMEs can determine audience engagement levels for media based on registered panel members. That is, an AME enrolls people who consent to being monitored into a panel. The AME then monitors those panel members to determine media (e.g., television programs or radio programs, movies, DVDs, advertisements (ads), streaming media, websites, etc.) exposed to those panel members. In this manner, the AME can determine exposure metrics for different media based on the collected media measurement data.

DETAILED DESCRIPTION

Figure 1:
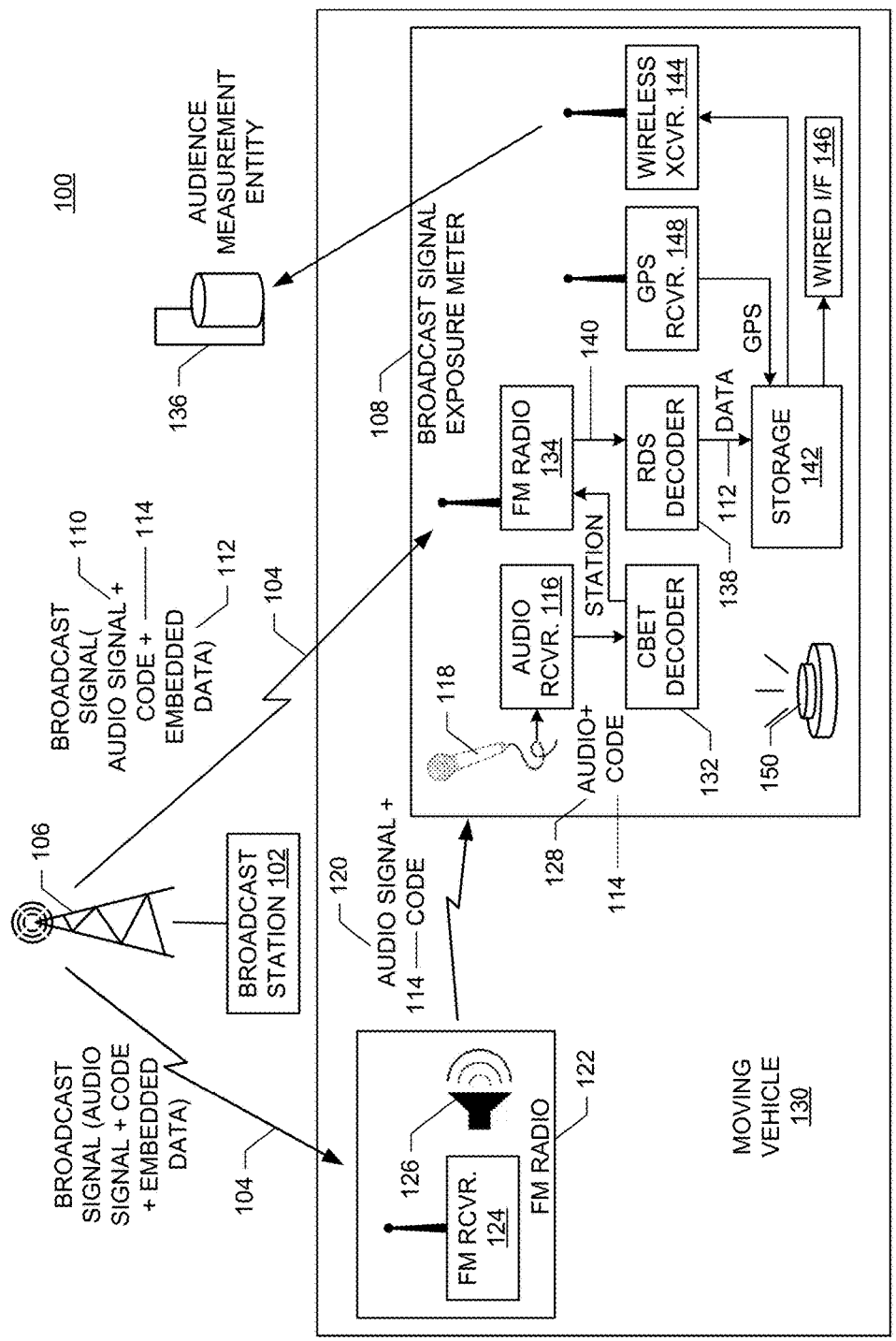
FIG. 1 is a block diagram of an example environment in which an exposure measurement system having a broadcast signal exposure meter operates, in accordance with this disclosure.

Some AMEs, such as The Nielsen Company (US), LLC (the Applicant of the present application) and/or other businesses, insert indiscernible (e.g., humanly inaudible, humanly imperceptible, etc.) watermarks into broadcast signals (e.g., an FM broadcast signal, a television signal, etc.). Example watermarks represent codes that identify broadcast stations, songs, times, etc. An example metering device, e.g., worn or carried by a panel member, records detected watermarks, and provides (e.g., uploads, transfers, sends, etc.) the recorded watermarks to a server associated with an AME. An example server decodes the recorded watermarks to measure exposure of the panelist to broadcasts, and determines audience exposure statistics. In contrast, the examples disclosed herein locally (e.g., at a portable metering device) measure exposure information (e.g., station, song, ad, time, etc.), and provide the locally measured exposure information to a server associated with an AME. The audience measurement examples disclosed herein utilize the embedded data already commonly provided in broadcast signals to measure exposure, and can be used to measure exposure to what was broadcast.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

FIG. 1 is a block diagram of an example environment in which an exposure measurement system 100 having an example broadcast station 102 transmitting an example broadcast signal 104 via an antenna 106, and an example broadcast signal exposure meter 108, in accordance with this disclosure, to measure exposures to media (e.g., songs, programs, shows, sports events, educational programs, ads, etc.), of the broadcast signals 104 operate, in accordance with this disclosure.

The example broadcast signal 104 of FIG. 1 includes an audio signal 110 that has embedded data 112, in accordance with, for example, RDS or RBDS. However, other types of broadcast signals (e.g., AM radio signals, analog TV signals, digital TV signals, satellite TV signals, etc.) and/or other methods for embedding data may be used with the teachings of this disclosure. In some examples, the embedded data 112 is inserted by the broadcast station 102 without influence or instruction from an AME for, for example, audience benefit. In some examples, the example audio signal 110 includes indiscernible watermarks, such as audience measurement watermark codes 114 from The Nielsen Company. In some examples, the watermark codes 114 are inserted using critical band encoding technology (CBET) or enhanced CBET developed by The Nielsen Company.

To receive audio signals, the example broadcast signal exposure meter 108 includes an example audio receiver 116 and an example microphone 118. The example audio receiver 116 and the example microphone 118 of FIG. 1 receive an audio signal 120 output by a nearby end user broadcast receiver in the form of, for example, a conventional FM radio 122. In the example of FIG. 1, an FM receiver 124 of the example FM radio 122 is tuned to the broadcast station 102 and receives the broadcast signal 104. The FM radio 122 transmits the audio signal 110 of the received broadcast signal 104 as the example audio signal 120 via an example speaker 126. Because the audio signal 110 in the broadcast signal 104 includes the embedded data 114, the example audio signal 120 also includes the embedded data 114. The example audio receiver 116 outputs the audio signal 120 as an audio signal 128. Because the audio signal 120 includes the embedded data 114, the example audio signal 128 also includes the embedded data 114. The audio signals 120 and 128 correspond to the audio signal 110, but may differ from each other and/or from the audio signal 110 due to, for example, analog audio circuitry, the microphone 118, the speaker 126, noise, etc.

The example broadcast signal exposure meter 108 needs to be close enough to the FM radio 122 to receive the audio signal 120. The audio signal 120 may be received acoustically, wirelessly and/or electrically. For example, the broadcast signal exposure meter 108 and the FM radio 122 may be in the same moving vehicle 130 (e.g., a car, plane, train, boat, etc.), in the same room in a building, nearby outdoors, etc. Moreover, a panelist's broadcast signal exposure meter 108 can operate anywhere they are near a broadcast signal and a conventional receiver, such as, in a bar, store, etc. Further still, the broadcast signal exposure meter 108 could be electrically coupled to the FM radio 122 via, for example, an audio cable.

To decode the watermark code 114, the example broadcast signal exposure meter 108 of FIG. 1 includes an example watermark decoder in the form of, for example, an example CBET decoder 132. The example CBET decoder 132 of FIG. 1 decodes the watermark code 114 in the audio signal 128 to extract a broadcast station identifier for the broadcast station 102. In some examples, the CBET decoder 132 decodes additional information (e.g., times, etc.) from the audio signal 128. In some examples, the CBET decoder 132 identifies the transmission frequency of the broadcast station 102 from the decoded broadcast station identifier, and provides the identified frequency to a broadcast signal receiver in the form of, for example, an FM radio 134. For example, the CBET decoder 132 can obtain the transmission frequency by querying a look-up table using the broadcast station identifier and, in some examples, a geographic location or area. In some examples, the watermark code 114 includes the transmission frequency and, in some example, location of the broadcast station 102. Additionally, or alternatively, the audio signal 128 can be sent by the broadcast signal exposure meter 108 to a server associated with an AME 136 for decoding, the broadcast station identifier can be used to query a remote database (not shown) to get transmission frequency information, voice recognition can be used to recognize spoken station identifiers in the audio signal 128, frequencies can be scanned until the audio signal 120 is also being received via the FM radio 134, etc. The example FM radio 134 of FIG. 1 tunes to the identified broadcast station transmission frequency, and begins receiving the same broadcast signal 104 as the FM radio 122. In some examples, the identified broadcast station 102 is verified by comparing the audio signal 120 with an audio signal that is received via the FM radio 134. In some examples, the CBET decoder 132 records and/or decodes the watermarks (e.g., audio signatures) present in the broadcast signal 104.

As will be described in detail, the example broadcast signal exposure meter 108 of FIG. 1 can use the audio signal 120 already being conventionally output by a speaker 126 of the FM radio 122 to automatically identify the broadcast station 102 to which the FM radio 122 is tuned and, thus, to which broadcast signal a person is being exposed. By automatically tuning to the automatically identified broadcast station 102, the broadcast signal exposure meter 108 can automatically begin measuring exposure of a panelist near the FM radio 122 to the broadcast station 102, using a standard FM radio 122 and without user involvement.

To decode the embedded data 112 in the broadcast signal 102, the example broadcast signal exposure meter 108 of FIG. 1 includes an example decoder in the form of, for example, an example RDS decoder 138. The example FM radio 134 extracts and provides to the example RDS decoder 138 a signal 140 containing the embedded data 112. For example, for RDS, the FM radio 134 extracts a 57-kHz sub-carrier of the broadcast signal 104 as the signal 140. The example RDS decoder 138 of FIG. 1 demodulates the 57-kHz sub-carrier signal 140 to form a baseband signal, and decodes bits of the baseband signal to extract the embedded data 112.

In some examples, the embedded data 112 is stored in any number and/or type(s) of computer-readable storage devices 142, which may be non-removable, removable, volatile, and/or non-volatile for subsequent transfer (upload, transfer send, etc.) to, for example, the AME 136. Additionally, and/or alternatively, the embedded RDS data 112 may be provided to the AME 136 via, for example, a wireless transceiver 144 (e.g., a Wi-Fi transceiver, a satellite transceiver, a cellular transceiver, a near field communication (NFC) transceiver, a Bluetooth receiver, etc.) as the RDS data 112 is decoded, continually, at intervals, and/or when connectivity with the AME 136 is available. In some examples, the broadcast signal exposure meter 108 includes a wired interface 146 (e.g., a universal serial bus (USB) interface, a wired network interface, etc.) that enables the broadcast signal exposure meter 108 to transfer the embedded data 112 to another device for subsequently transfer to the AME 136.

Because the embedded data 112 contains information regarding specific pieces of media (e.g., songs, programs, shows, sports events, educational programs, advertisements, etc.) on the broadcast signal 104, the embedded data 140 can be readily used to form advanced media exposure associations. For example, 70% of listeners at 5 pm have dwelled for at least the next 30 minutes on a station that airs song X and song Y within 5 minutes of each other. Such information may be used to, for example, assist in song selection, target advertising, draw a target audience, etc.

In some examples, the example broadcast signal exposure meter 108 includes a location detector in the form of, for example, a global positioning satellite (GPS) receiver 148 to obtain location information. Additionally, and/or alternatively, the wireless transceiver 144 may be used to obtain location information. The location information may be stored in the storage 142 together with the embedded data 112, allowing exposure measurements to be associated with location. For example, 40% of listeners on I-94 at 8 AM on Mondays are tuned to All Sports 94.5, and another 40% are tuned to NPR.

To gather customer preference data or information, the example broadcast signal exposure meter 108 of FIG. 1 can include one or more user interface elements, such as a "like" button 150. When a user presses the example button 150 while embedded data 112 is being captured, the pressing of the button 150 is associated in the storage 142 with the embedded data 112 being received when the time the button 150 was pressed. Such a button press may be used to, for example, identify a person's preference for (e.g., "like" of) a particular piece of media (e.g., a particular song). In some examples, a status of the button 150 changes (e.g., it illuminates) to indicate when embedded data 112 is actively being received, signifying that the "like" button 150 available to be used to indicate a preference for a piece of media.

While an example manner of implementing the broadcast signal exposure meter 108 is illustrated in FIG. 1, one or more of the elements, processes and/or devices illustrated in FIG. 1 may be combined, divided, re-arranged, omitted, eliminated and/or implemented in any other way. Further, the example audio receiver 116, the example decoder 132, the example radio 134, the example decoder 138, the example storage 142, the example wireless transceiver 144, the wired interface 146, and/or the example GPS receiver 148 and/or, more generally, the example broadcast signal exposure meter 108 of FIG. 1 may be implemented by hardware, software, firmware and/or any combination of hardware, software and/or firmware. Thus, for example, any of the example audio receiver 116, the example decoder 132, the example radio 134, the example decoder 138, the example storage 142, the example wireless transceiver 144, the wired interface 146, and/or the example GPS receiver 148 and/or, more generally, the example broadcast signal exposure meter 108 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio receiver 116, the example decoder 132, the example radio 134, the example decoder 138, the example storage 142, the example wireless transceiver 144, the wired interface 146, and/or the example GPS receiver 148 and/or, more generally, the example broadcast signal exposure meter 108 of FIG. 1 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example broadcast signal exposure meter 108 of FIG. 1 may include one or more elements, processes and/or devices in addition to, or instead of, those illustrated in FIG. 1, and/or may include more than one of any or all of the illustrated elements, processes and devices.

Figure 2:
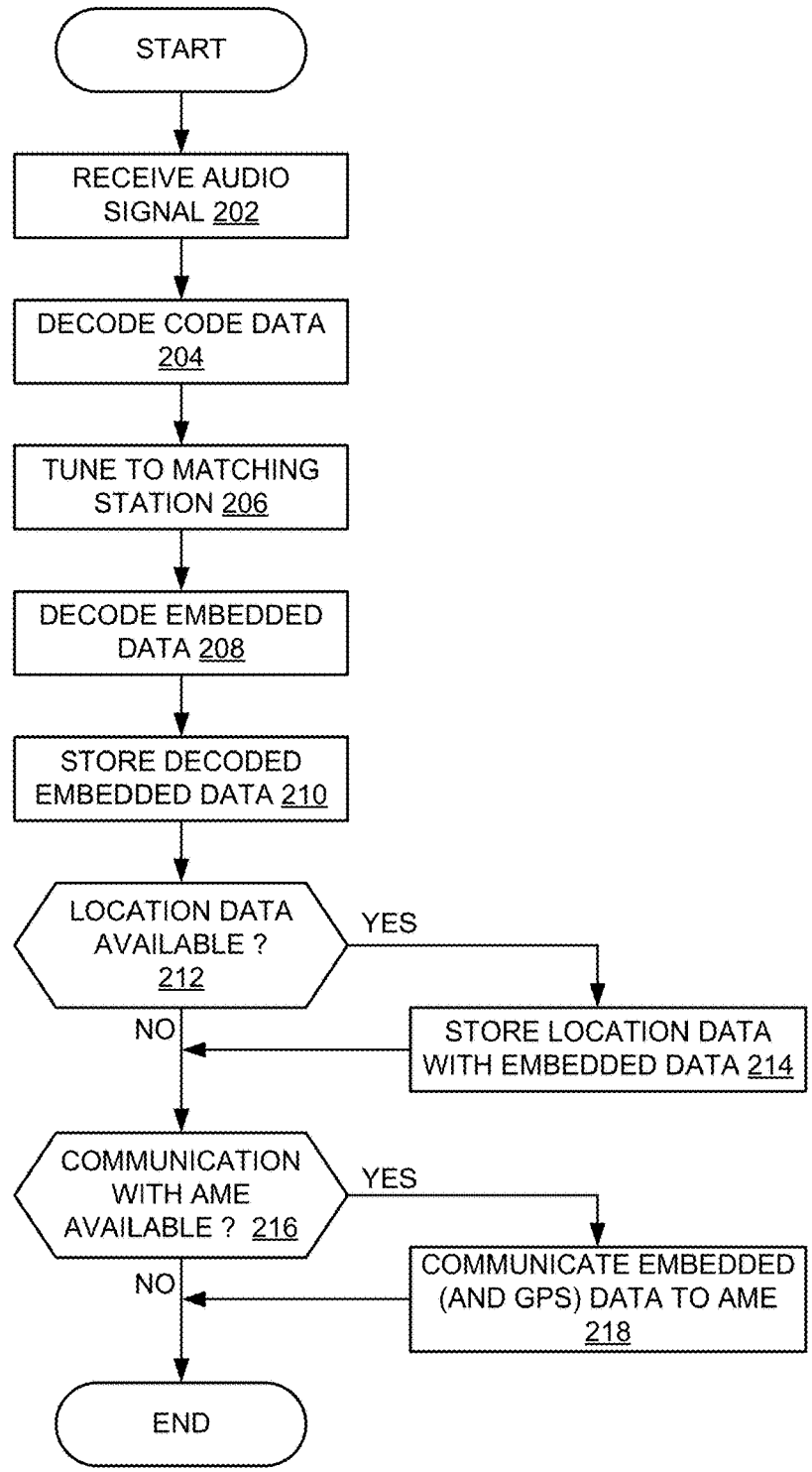
FIG. 2 is a flow diagram representing example processes that may be implemented as machine-readable instructions and executed by a processor to implement the example broadcast signal exposure meter of FIG. 1.

A flowchart representative of example machine-readable instructions for implementing the example broadcast signal exposure meter 108 of FIG. 1 is shown in FIG. 2. In this example, the machine-readable instructions comprise a program for execution by a processor such as the processor 312 shown in the example processor platform 300 discussed below in connection with FIG. 3. The program may be embodied in software stored on a non-transitory computer-readable storage medium such as a CD, a floppy disk, a hard drive, a DVD, a Blu-ray disk, or a memory associated with the processor 312, but the entire program and/or parts thereof could alternatively be executed by a device other than the processor 312 and/or embodied in firmware or dedicated hardware. Further, although the example program is described with reference to the flowchart illustrated in FIG. 2, many other methods of implementing the example broadcast signal exposure meter 108 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 2 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example processes of FIG. 2 include the audio receiver 116 receiving an audio signal from the FM radio 122 (block 202), and a decoder 132 decoding a watermark code in the audio signal to identify a broadcast station (block 204). The FM radio 134 tunes to and receives a broadcast signal from the identified broadcast station (block 206), and a decoder 138 decodes the embedded data 112 in the broadcast signal (block 208), and stores the decoded embedded data 112 (block 210). If location data is available (block 212), the location data is stored with the embedded data 112 (block 214). If communication with the AME 137 is available (e.g., via the wireless transceiver 144, the wired interface 146, etc.) (block 216), the embedded data 112 and location data (if available) are transferred (e.g., communicated, transmitted, provided, etc.) to the AME 136 (block 218). Control then exits from the example processes of FIG. 2.

Figure 3:
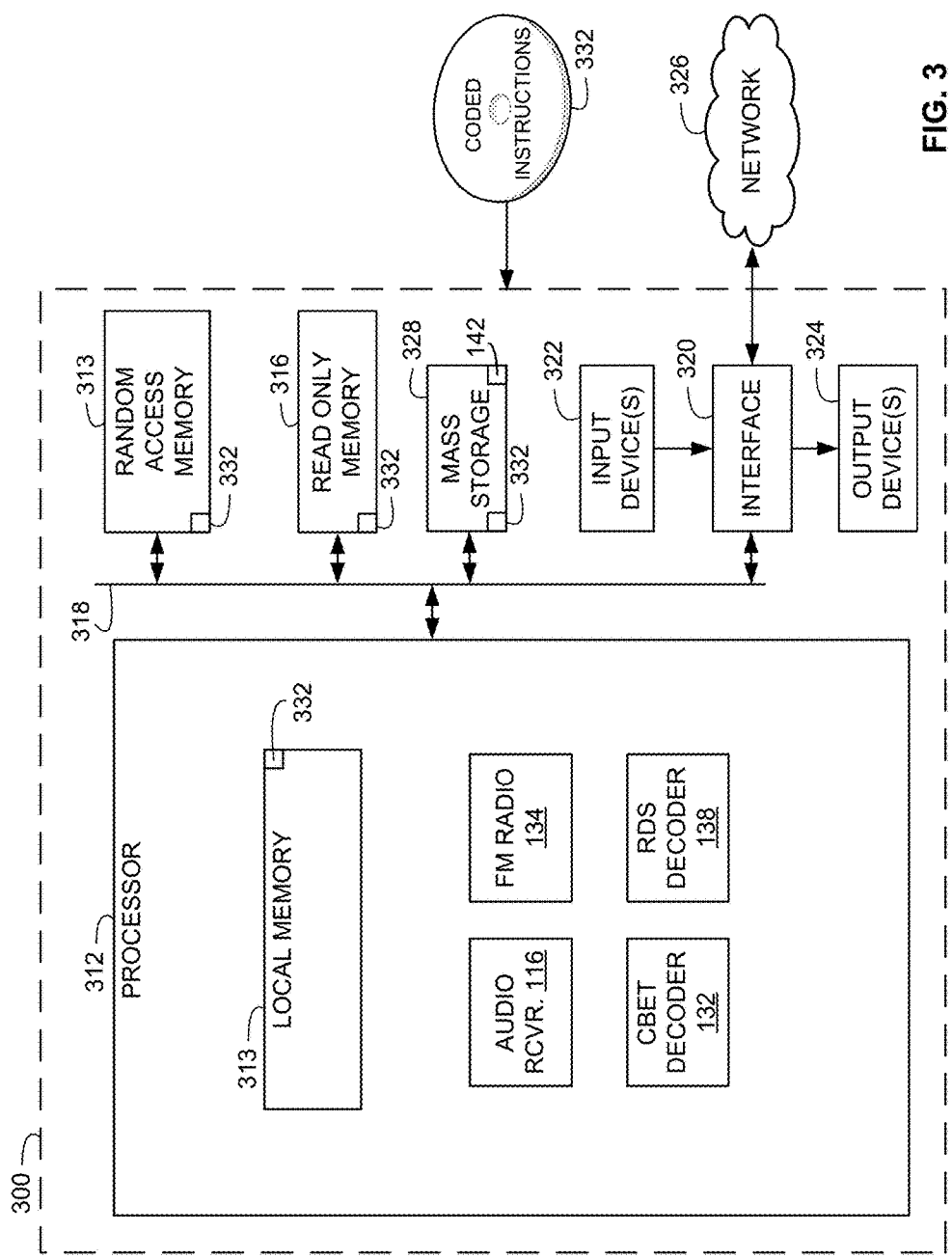
FIG. 3 illustrates an example processor system configured to execute the example instructions of FIG. 2 to implement the example broadcast signal exposure meter of FIG. 1.

FIG. 3 is a block diagram of an example processor platform 300 capable of executing the instructions of FIG. 2 to implement the broadcast signal exposure meter 108 of FIG. 1. The processor platform 300 can be, for example, a server, a personal computer, a mobile device (e.g., a cell phone, a smart phone, a tablet such as an iPad®), a personal digital assistant (PDA), an Internet appliance, a DVD player, a CD player, a digital video recorder, a Blu-ray player, a gaming console, a personal video recorder, a set top box, or any other type of computing device.

The processor platform 300 of the illustrated example includes a processor 312. The processor 312 of the illustrated example is hardware. For example, the processor 312 can be implemented by one or more integrated circuits, logic circuits, microprocessors or controllers from any desired family or manufacturer. The hardware processor may be a semiconductor based (e.g., silicon based) device. In this example, the processor implements one or more of the example audio receiver 116, the example decoder 132, the example FM radio 134, and the example decoder 138.

The processor 312 of the illustrated example includes a local memory 313 (e.g., a cache). The processor 312 of the illustrated example is in communication with a main memory including a volatile memory 314 and a non-volatile memory 316 via a bus 318. The volatile memory 314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 316 may be implemented by flash memory and/or any other desired type of memory device. Access to the main memory 314, 316 is controlled by a memory controller. In this example, the memory 316 implements the example storage 142.

The processor platform 300 of the illustrated example also includes an interface circuit 320. The interface circuit 320 may be implemented by any type of interface standard, such as an Ethernet interface, a USB interface, and/or a peripheral component interconnect (PCI) express interface. In this example, the interface circuit 320 can implement the example wired interface 146.

In the illustrated example, one or more input devices 322 are connected to the interface circuit 320. The input device(s) 322 permit(s) a user to enter data and/or commands into the processor 312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 324 are also connected to the interface circuit 320 of the illustrated example. The output devices 324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 320 of the illustrated example, thus, typically includes a graphics driver card, a graphics driver chip and/or a graphics driver processor.

The interface circuit 320 of the illustrated example also includes a communication device such as a transmitter, a receiver, a transceiver, a modem and/or network interface card to facilitate exchange of data with external machines (e.g., computing devices of any kind) via a network 326 (e.g., an Ethernet connection, a digital subscriber line (DSL), a telephone line, coaxial cable, a cellular telephone system, etc.). In this example, the interface circuit 320 can implement the example wireless transceiver 144 and/or the example GPS receiver 148.

The processor platform 300 of the illustrated example also includes one or more mass storage devices 328 for storing software and/or data. Examples of such mass storage devices 328 include floppy disk drives, hard drive disks, compact disk drives, Blu-ray disk drives, RAID systems, and DVD drives.

The coded instructions 332 of FIG. 2 may be stored in the mass storage device 328, in the volatile memory 314, in the non-volatile memory 316, and/or on a removable tangible computer-readable storage medium such as a CD or DVD.

From the foregoing, it will be appreciated that example methods, apparatus and articles of manufacture have been disclosed that measure exposure to broadcast signals having embedded data. From the foregoing, it will be appreciated that methods, apparatus and articles of manufacture have been disclosed which enhance the operations of a computer by being able to accurate measure exposure to media that was actually presented, as opposed to media that was scheduled to be presented. Moreover, the examples disclosed herein can be used to measurement exposure to media without having to modify a user's broadcast receiver. In some examples, computer operations can be made more efficient using RDS embedded data that is simpler to detect and decode. That is, through the use of the processes disclosed herein, computers can operate more efficiently to measure exposure to broadcast signals, thereby, providing audience measurement data that exceeds that of today's systems.

Example methods and apparatus to measure exposure to broadcast signals having embedded data have been disclosed in detail above and in the attached drawings. Further examples and combinations thereof include at least the following.

Example 1 is a broadcast signal exposure meter that includes a first decoder to obtain an identifier of a broadcast station from an audio signal output by an end user broadcast receiver, a radio to tune to a broadcast signal from the broadcast station associated with the identifier of the broadcast station, a second decoder to obtain embedded data from the broadcast signal, the embedded data representing media contained in the broadcast signal; and an interface to provide the embedded data to a server, the server to determine audience measurement information for the media based on the provided embedded data.

Example 2 is the broadcast signal exposure meter of example 1, further including a location detector to determine location information, wherein the interface provides the location information with the embedded data to the server.

Example 3 is the broadcast signal exposure meter of example 1, wherein the first decoder includes a critical band encoding technology (CBET) decoder.

Example 4 is the broadcast signal exposure meter of example 1, wherein the second decoder includes at least one of a radio data system (RDS) decoder or a radio broadcast data system (RBDS) decoder.

Example 5 is the broadcast signal exposure meter of example 1, further including a microphone to receive the audio signal.

Example 6 is the broadcast signal exposure meter of example 1, wherein the end user broadcast receiver and the radio each include a frequency modulation (FM) radio.

Example 7 is the broadcast signal exposure meter of example 1, wherein the interface includes at least one of a satellite transceiver, a wireless fidelity (Wi-Fi) transceiver, a cellular transceiver, a Bluetooth transceiver, or a near field communication (NFC) transceiver.

Example 8 is the broadcast signal exposure meter of example 1, further including a user interface element to receive preference information for media contained in the broadcast signal, wherein the interface provides the preference information with the embedded data to the server.

Example 9 is a method including obtaining an identifier of a broadcast station from an audio signal output by an end user broadcast receiver, tuning a receiver to the broadcast station associated with the identifier of the broadcast station to receive a broadcast signal corresponding to the audio signal, obtaining embedded data from the broadcast signal, the embedded data identifying media contained in the broadcast signal, and providing the embedded data to a server, the server to determine audience measurement information for the media based on the provided embedded data.

Example 10 is the method of example 9, further including obtaining location information, and providing the location information with the embedded data to the server.

Example 11 is the method of example 9, wherein obtaining the identifier of the broadcast station includes decoding a critical band encoding technology (CBET) signal, and obtaining the embedded data includes obtaining radio data system (RDS) decoder information encoded in the broadcast signal.

Example 12 is the example of example 9, wherein broadcast signal includes a frequency modulation (FM) radio broadcast signal.

Example 13 is the example of example 9, wherein the embedded data is provided on a continual basis.

Example 14 is the method of example 9, further including storing the embedded data, wherein the embedded data is provided when communicative connectivity with the server is available.

Example 15 is the method of example 9, wherein providing the embedded data includes transferring the embedded data using at least one of a wireless fidelity (Wi-Fi) signal, a cellular signal, a satellite signal, a Bluetooth signal, or a near field communication (NFC) signal.

Example 16 is the method of example 9, further including receiving preference information for media contained in the broadcast signal, associating the preference information with the embedded data, and providing the preference information with the embedded data to the server.

Example 17 is a tangible computer-readable storage medium comprising instructions that, when executed, cause a machine to perform at least obtaining an identifier of a broadcast station from an audio signal output by an end user broadcast receiver, tuning a receiver to the broadcast station associated with the identifier of the broadcast station to receive a broadcast signal corresponding to the audio signal, obtaining embedded data from the broadcast signal, the embedded data identifying media contained in the broadcast signal, and providing the embedded data to a server, the server to determine audience measurement information for the media based on the provided embedded data.

Example 18 is the tangible computer-readable storage medium as defined in example 17, including further instructions that, when executed, cause the machine to perform obtaining location information, and providing the location information with the embedded data to the server.

Example 19 is the tangible computer-readable storage medium as defined in example 17, including further instructions that, when executed, cause the machine to perform obtaining the identifier of the broadcast station by decoding a critical band encoding technology (CBET) signal, and obtaining the embedded data includes obtaining radio data system (RDS) decoder information encoded in the broadcast signal.

Example 20 is the tangible computer-readable storage medium as defined in example 17, including further instructions that, when executed, cause the machine to perform receiving preference information for media contained in the broadcast signal, associating the preference information with the embedded data, and providing the preference information with the embedded data to the server.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, as used herein, when the phrase "at least" is used in this specification and/or as the transition term in a preamble of a claim, it is open-ended in the same manner as the term "comprising" is open ended.

Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A broadcast signal exposure meter comprising:
    a first decoder to obtain an identifier of a broadcast station from an audio signal output by an end user broadcast receiver;
    a radio to tune to a broadcast signal from the broadcast station associated with the identifier of the broadcast station;
    a second decoder to obtain embedded data from the broadcast signal, the embedded data representing media contained in the broadcast signal;
    a location detector to determine location information; and
    an interface to provide the embedded data and the location information to a server, the server to determine audience measurement information for the media based on the provided embedded data.

2. The broadcast signal exposure meter of claim 1, wherein the first decoder includes a critical band encoding technology (CBET) decoder.

3. The broadcast signal exposure meter of claim 1, wherein the second decoder includes at least one of a radio data system (RDS) decoder or a radio broadcast data system (RBDS) decoder.

4. The broadcast signal exposure meter of claim 1, further including a microphone to receive the audio signal.

5. The broadcast signal exposure meter of claim 1, wherein the end user broadcast receiver and the radio each include a frequency modulation (FM) radio.

6. The broadcast signal exposure meter of claim 1, wherein the interface includes at least one of a satellite transceiver, a wireless fidelity (Wi-Fi) transceiver, a cellular transceiver, a Bluetooth transceiver, or a near field communication (NFC) transceiver.

7. The broadcast signal exposure meter of claim 1, further including a user interface element to receive preference information for media contained in the broadcast signal, wherein the interface provides the preference information with the embedded data and the location information to the server.

8. A method comprising:
    obtaining an identifier of a broadcast station from an audio signal output by an end user broadcast receiver;
    tuning a receiver to the broadcast station associated with the identifier of the broadcast station to receive a broadcast signal corresponding to the audio signal;
    obtaining embedded data from the broadcast signal, the embedded data identifying media contained in the broadcast signal;
    obtaining location information; and
    providing the embedded data and the location information to a server, the server to determine audience measurement information for the media based on the provided embedded data.

9. The method of claim 8, wherein obtaining the identifier of the broadcast station includes decoding a critical band encoding technology (CBET) signal, and obtaining the embedded data includes obtaining radio data system (RDS) decoder information encoded in the broadcast signal.

10. The method of claim 8, wherein the broadcast signal includes a frequency modulation (FM) radio broadcast signal.

11. The method of claim 8, wherein the embedded data and the location information are provided on a continual basis.

12. The method of claim 8, further including storing the embedded data and the location information, wherein the embedded data and the location information are provided when communicative connectivity with the server is available.

13. The method of claim 8, wherein providing the embedded data and the location information includes transferring the embedded data and the location information using at least one of a wireless fidelity (Wi-Fi) signal, a cellular signal, a satellite signal, a Bluetooth signal, or a near field communication (NFC) signal.

14. The method of claim 8, further including:
receiving preference information for media contained in the broadcast signal;
associating the preference information with the embedded data; and
providing the preference information with the embedded data and the location information to the server.

15. A non-transitory computer-readable medium comprising instructions that, when executed, cause a machine to at least:
obtain an identifier of a broadcast station from an audio signal output by an end user broadcast receiver;
tune a receiver to the broadcast station associated with the identifier of the broadcast station to receive a broadcast signal corresponding to the audio signal;
obtain embedded data from the broadcast signal, the embedded data identifying media contained in the broadcast signal;
obtain location information; and
provide the embedded data and the location information to a server, the server to determine audience measurement information for the media based on the provided embedded data.

16. The non-transitory computer-readable medium as defined in claim 15, including further instructions that, when executed, cause the machine to obtain the identifier of the broadcast station by decoding a critical band encoding technology (CBET) signal, and obtain the embedded data by obtaining radio data system (RDS) decoder information encoded in the broadcast signal.

17. The non-transitory computer-readable medium as defined in claim 15, including further instructions that, when executed, cause the machine to:
receive preference information for media contained in the broadcast signal;
associate the preference information with the embedded data; and
provide the preference information with the embedded data and the location information to the server.

* * * * *